United States Patent [19]

Werkema et al.

[11] Patent Number: 4,575,477

[45] Date of Patent: Mar. 11, 1986

[54] COATINGS AND COATED PAPERS FOR GRAVURE PRINTING

[75] Inventors: Donald A. Werkema; Richard A. Willency; Do I. Lee, all of Midland, Mich.

[73] Assignee: The Dow Chemical Company, Midland, Mich.

[21] Appl. No.: 556,250

[22] Filed: Nov. 29, 1983

[51] Int. Cl.[4] .............................................. B32B 21/04

[52] U.S. Cl. .............................. 428/537.5; 428/479.6; 525/451; 524/521

[58] Field of Search .......................... 428/479.6, 537.5; 525/451; 524/521

[56] References Cited

U.S. PATENT DOCUMENTS

| | | | |
|---|---|---|---|
| 3,365,410 | 1/1968 | Wesslau et al. | 524/521 |
| 4,298,652 | 11/1981 | Suzuki et al. | 428/342 |
| 4,435,548 | 3/1984 | Tomalia et al. | 525/451 |

*Primary Examiner*—Edith Buffalow

[57] ABSTRACT

Paper having improved printability in rotogravure printing is provided by coating a paper substrate with an aqueous coating formulation containing a pigment such as kaolin clay, a binder such as a styrene/-butadiene/itaconic acid terpolymer and a polyamidoamine such as the reaction product derived from ethylene diamine and methylacrylate.

11 Claims, No Drawings

COATINGS AND COATED PAPERS FOR GRAVURE PRINTING

BACKGROUND OF THE INVENTION

This invention relates to coated papers suitable for gravure printing and to coating compositions used to prepare such coated papers.

The use of rotogravure printing processes in printing high volume, high quality publications such as magazines, catalogues, product brochures and the like is well-known. In such processes, a gravure master is employed which usually has a shape which has a working surface which is generally smooth except for a regular array of tiny, discrete intaglio cell cavities which are excavated to a depth below the working surface. This array of cavities corresponds to the images to be printed on the paper. Ink is applied to the working surface such that the cavities retain significant amounts of the ink below the working surface. The master is then pressed against a paper web, and the ink transfers from the cavities to the paper thereby producing a printed reproduction of the desired image on the paper.

Rotogravure printing, unlike offset printing and letter press printing, is very sensitive to poor ink transfer. For example, missing gravure dots and defective reproduction dots are often noticed by the reader. Thus, a smooth and ink receptive paper is generally required.

The paper used in the rotogravure printing process is normally a coated paper comprising a wood pulp web as the substrate and a coating containing a pigment and a binder, e.g., a natural binder such as starch, a synthetic binder such as a styrene/butadiene latex or a mixture thereof.

Unfortunately, most of the coated papers used in rotogravure printing are either very expensive and/or are not sufficiently smooth and ink receptive to permit the high speed, high quality, printing that is desired in rotogravure printing processes.

Therefore, it is highly desirable to provide a coated paper that is relatively inexpensive which has improved printability in rotogravure processes.

SUMMARY OF THE INVENTION

In one aspect, the present invention is such a coated paper comprising a paper substrate and a coating resulting from an aqueous coating formulation containing an opacifying amount of a pigment, a binding amount of a binder and an amount of a polyamidoamine sufficient to cause the pigment to interact or agglomerate. For example, such interaction can result in the flocculation of the pigment from the aqueous phase of the formulation.

In another aspect, the present invention is an aqueous coating formulation comprising a pigment, a binder and an amount of a polyamidoamine sufficient to cause pigment interaction or agglomeration.

In yet a further aspect, the present invention is a process for printing the aforementioned coated paper by a rotogravure printing method. The coated papers of this invention are also useful in offset printing. Moreover, the coating formulations are suitable as paper board coatings, for example, cylinder board coatings, bleached and unbleached Fourdrinier board coating and cast coating.

Surprisingly, the practice of the present invention enables the rotogravure printing of relatively inexpensive paper without significant loss of printing quality or speed of printing. The coating formulations of this invention exhibit excellent fluidity, thus permitting them to be applied to paper substrates at very high speeds without the coatweight control problems often experienced with conventional formulations.

DETAILED DESCRIPTION OF THE INVENTION

Any paper which can be conventionally employed in rotogravure printing can be suitably employed in the practice of this invention. Examples of such papers include those prepared from high yield pulps such as unbleached, semi-bleached or bleached pulps as well as mixtures of two or more of such pulps. Such pulps are similar to those used in newsprint paper, paper board, medium-grade paper, medium-grade coated paper, ground wood paper and others such as described in U.S. Pat. No. 4,298,652.

Suitable pigments for purposes of this invention are any of those conventionally employed in rotogravure coating formulations, including such pigments as titanium dioxide, kaolin clay, barium sulfate, precipitated or ground calcium carbonate, aluminum hydroxide, satin white, calcium sulfite, zinc sulfite, plastic pigments and the like. Of these, kaolin clay is preferred.

Binders preferably employed include aqueous dispersions of copolymers of styrene, butadiene, and/or acrylonitrile with ethylenically unsaturated carboxylic acids as illustrated in U.S. Pat. No. 3,409,569; aqueous dispersions of copolymers of conjugated diolefins and unsaturated carboxylic acids; aqueous dispersions of copolymers of lower alkyl acrylate esters with acrylic acid or methacrylic acid such as shown in U.S. Pat. No. 3,365,410; latexes of copolymers of vinyl esters of saturated carboxylic acids and ethylenically unsaturated carboxylic acids such as vinyl acetate/acrylic acid copolymers and vinyl acetate/butyl acrylate/acrylic acid copolymers; and various other alkali sensitive synthetic resin emulsions as well as mixtures thereof. Of the foregoing synthetic resin binders, the latexes of styrene/-butadiene/ethylenically unsaturated carboxylic acid terpolymers are most preferred. Also suitable, although not as preferred as the foregoing binders are latexes of styrene and butadiene binary copolymers, methacrylate/butadiene binary copolymers and other polymers of acrylic and methacrylic esters; latexes of hydroxyalkyl polymers including alkyl acrylate/hydroxyethyl acrylate copolymer; latexes of vinyl acetate polymers and copolymers such as ethylene/vinyl acetate copolymer and the like. Also suitable, but less preferred are natural binders such as oxidized or esterified starch in proteins such as casein, soybean protein and petroleum protein.

Polyamidoamines which are suitably employed as pigment agglomerating agents in the practice of this invention are advantageously characterized as having a backbone containing both amide and amine linkages. In addition, the polyamidoamine backbone may bear one or more pendant amine, amide, amidoamine or ammonium moieties. Examples of such amidoamine polymers are linear polyamidoamines as described in U.S. Pat. No. 3,445,441; branched polyamido- amines as described in U.S. patent application Ser. No. 258,158, filed Apr. 27, 1981 now U.S. Pat. No. 4,435,548; ammonium polyamidoamines as described in U.S. patent application Ser. No. 336,538, filed Jan. 4, 1982 now U.S. Pat. No. 4,416,789; curable ammonium polyamidoamines as described in U.S. patent application Ser. No. 383,905, filed June 1, 1982 now U.S. Pat. No. 4,402,748; and the like. Of the foregoing polyamidoamines, the linear polyamidoamines and branched polyamidoamines are preferred.

The linear polyamidoamines are conveniently prepared in the manner described in U.S. Pat. No. 3,305,493, the relevant portions of which are incorporated herein by reference. In general, this polyamidoamine is prepared by contacting an alkylene diamine or a polyalkylene polyamine with an ethylenically unsaturated compound such as an alkyl acrylate such as methyl acrylate, acrylamide, acrylic acid or methacrylic acid under reactive conditions. Preferably, the foregoing reactants are employed in stoichiometric ratio to form a linear polyamidoamine represented by the formula:

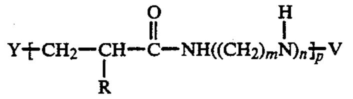

wherein each R is independently hydrogen or lower alkyl, e.g., methyl or ethyl; Y is a terminal group characteristic of polyamidoamines; V is hydrogen or the residue of polymerization to form a polyamidoamine; each m is independently a whole number from 2 to 6, preferably 2; each n is independently a whole number from 1 to 3, more preferably 1 or 2, most preferably 1; and p is a whole number sufficient to provide the polyamidoamine with a weight average molecular weight ($M_w$) of at least 500 up to about 20,000. More preferably, the linear polyamidoamine has a $M_w$ of at least about 1,000 up to about 20,000, especially at least 2,000 up to about 15,000, most preferably from about 4,000 to about 10,000.

The branched polyamidoamine is prepared by contacting the aforementioned linear polyamidoamine with an ethylenically unsaturated carboxylic compound under conditions sufficient to produce a Michaels addition reaction between the amine moiety of the linear polyamidoamine and the ethylenically unsaturated moiety of the carboxylic compound as illustrated hereinbefore. Of such carboxylic compounds, methacrylate is most preferred. The reaction of the unsaturated compound with the linear polyamidoamine should occur at a temperature at which substantial cross-linking of the polymer is avoided. Generally, such temperature is in the range from about 0° C. to about 200° C., with temperatures from about 20° C. to 100° C. being preferred. While the foregoing reaction can be conducted neat, it is generally desirable to employ a diluent which is a solvent for the polyamidoamine but which is substantially inert to the reactants. Water and lower alkanols having from 1 to 4 carbons are generally preferred diluents, with methanol being the most preferred. The ratio of carboxylic compound to equivalents of amino hydrogens in the linear polyamidoamine can be varied to produce the desired substitution of pendant carboxylic groups on the polyamidoamine. If complete substitution is desired, a stoichiometric amount or an excess of the unsaturated carboxylic compound is employed. However, if a lesser degree of substitution is desired, the reactants can be combined in the desired ratio and essentially completely reacted. In preparing such a branched polyamidoamine, it is generally desirable that at least 50 mole percent of the total amino nitrogens of the linear polyamidoamine be reacted with the unsaturated carboxylic compound, preferably at least 75 mole percent of such amino hydrogens are reacted. The resulting polyamidoamine bearing the pendant carboxyl moieties are then reacted with amines via an amidation reaction to produce the desired branched polyamidoamine. Such desired branched polyamidoamine are represented by the formula:

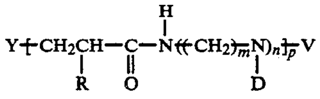

wherein Y, V, R, m, n and p are as defined hereinbefore and D at each occurrence is independently hydrogen or

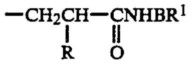

wherein $R^1$ at each occurrence is independently H, a $C_1$-$C_4$ alkyl or a $C_1$-$C_4$ hydroxyalkyl and B at each occurrence is independently $—(CH_2)_xNR^1—_y$ or

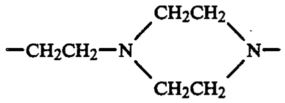

wherein x is an integer from 2 to 10 and y is an integer from 1 to 6 provided that at least 10 mole percent, preferably at least 20 percent, of D groups is

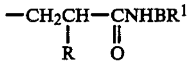

The coating formulation used in the present invention contains sufficient pigment to provide the desired degree of opacity to the resulting coated paper. Preferably, such amount of pigment is in the range from about 85 to about 96, most preferably from about 90 to about 94 parts by weight based on dry weight of the coating formulation. The total binder employed in the coating formulation is that which is sufficient to bond the pigment to the paper. Preferably, such an amount is in the range from about 4 to about 15, most preferably from about 6 to about 10 dry parts based on the dry weight of the coating formulation. The amount of polyamidoamine employed is that which is sufficient to cause the pigment interaction or agglomeration after the paper is coated. For the purposes of this invention, the ability of the polyamidoamine to cause the pigment to interact or agglomerate is measured by the improvement in rotogravure printability attained when using the polyamidoamine. A polyamidoamine is said to provide a suitable capability of pigment interaction or agglomeration if, when used in a paper coating formulation, it improves the rotogravure printability over a formulation without the polyamidoamine. Preferably, the amount of polyamidoamine is from about 0.01 to about 0.5, most preferably from about 0.06 to about 0.10 dry weight parts per 100 dry weight parts of the coating formulation.

In addition to the foregoing essential ingredients, the coating formulation may also contain optional additives such as viscosity modifiers, dispersants, antifoaming agents, lubricants, and water retention agents to the extent that they do not affect the ability of the polyamidoamine to flocculate the pigment.

In preparing the coated paper of the present example, a paper web or sheet as conventionally employed in rotogravure printing is employed. For example, such papers include those derived from bleached and unbleached sulfate pulps, bleached and unbleached sulfite pulps, bleached and unbleached soda pulps, neutral sulfite pulps, semichemical and chemical ground wood pulps, ground wood pulps and any combination of such pulps. The base paper or paper substrate is single coated or multiple coated on either surface or both surfaces thereof with the foregoing coating formulation by means of an on-machine or off-machine coater so that the coating weight on one surface is above 4.5 grams per square meter, preferably above 6 grams per square meter on a dry weight basis. The makeup of the coating formulation on each surface and that of the coating formulation forming each layer in a multiple coating may be changed as needed, coating that may be done by any process and by means of any conventional coating machines, for example, an air knife coater, a roll coater, a puddle type or inverted blade coater with beveled or bent blade, a bill blade coater, a twin blade coater, a short dwell coater and the like. Among these coating machines, the puddle, inverted blade and short dwell coaters are preferably employed.

Upon application of the coating, the coating is subjected to conventional procedures for drying and curing, for example, by passing through calender or supercalender rolls, air drying ovens and the like.

The following examples are given for purposes of illustrating the invention and should not be construed as limiting its scope. Unless otherwise stated, all parts and percentages are by weight.

EXAMPLE 1

A coating formulation is prepared consisting of 2 parts of a 48 percent solids latex of a styrene/-butadiene/itaconic (43.3/55.0/1.7) terpolymer, 100 parts of kaolin clay and 0.14 part of an aqueous solution of 61.5 percent of a linear polyamidoamine having an $M_w$ of about 6000 which is prepared by reacting equal molar amounts of ethylenediamine with methylacrylate.

Using this formulation, rotogravure base stock paper (35.5 grams per meter square) is coated on one side using a lab coater having a puddle blade and operating at a coating speed of 12.2 meters per minute. The coated paper is calendered between nip rolls operating at 2 to 3 nips and 150° F. at 1200 to 1500 pounds per linear inch.

The resulting coated paper is printed using a rotogravure print method as described in detail hereinafter and then tested for printability, gloss and brightness. The results of these tests are reported in Table I.

For purposes of comparison, the foregoing procedure is repeated using different amounts of branched and cross-linked polyamidoamines in substitution for the linear polyamidoamine used in the foregoing procedure. The resulting papers are similarly printed and tested and the results are reported in Table I.

Also for comparison, the foregoing procedure is repeated except that no polyamidoamine is employed in combination with the latex and pigment. The resulting coated paper is similarly printed and tested and the results are reported in Table I.

TABLE I

| Sample No. | Pigment[1] Type | PAMAM[2] Type | PAMAM[2] Amt | 75° Gloss[3] | Brightness[4] | Printability[5] |
|---|---|---|---|---|---|---|
| 1 | K-1 | L | 7 | 53 | 70.1 | 53.5 |
| 2 | K-1 | B | 5 | 53 | 70.4 | 62 |
| 3 | K-1 | C | 5 | 53 | 70.4 | 53 |
| 4 | K-2 | L | 7 | 53 | 70.9 | 55 |
| 5 | K-2 | B | 5 | 59 | 71.8 | 73 |
| 6 | K-2 | C | 5 | 51 | 70.8 | 58 |
| 7 | K-3 | L | 7 | 58 | 70.0 | 67 |
| 8 | K-3 | B | 5 | 59 | 69.9 | 67 |
| 9 | K-3 | C | 5 | 57 | 70.1 | 61 |
| C* | K-3 | | 0 | 54 | 68.7 | 31 |

*Not an example of the invention.
[1]K-1 - Kaolin clay (Hydrafine 90, Brightness of 90–92, 90–92% less than 2 micrometers).
K-2 - Kaolin clay (Hydrosperse, Brightness of 85.5–86.5, 80–82% less than 2 micrometers).
K-3 - Kaolin clay (NuClay, Brightness of 87–89, 82% less than 2 micrometers).
[2]L - Linear polyamidoamine having Mw of ~6,000 and made from ethylenediamine and methyl acrylate.
B - Branched polyamidoamine having Mw of ~14,000 and made from linear polyamidoamine reacted with methyl acrylate and ethylenediamine.
C - Cross-linked polyamidoamine having Mw of >50,000 and made from the addition of epichlorohydrin to the linear polyamidoamine (L).
Amount - in weight percent of the PAMAM based on the wet weight of the latex.
[3]TAPPI Standard Test Method T-504.
[4]TAPPI Stand Test Method UM 438.
[5]Printability measured using IGT AI C2 Printability Tester and CTP Heliotest Apparatus supplied by ET Laboratories of Grenoble, France. Conditions employed are a print speed of 0.6 meter/second and print pressure of 25 kilograms force Helio test Slow-Dri Red Butylcarbitol acetate RM21 (Fred/KH Levly Corp., New York, NY) is employed as the ink. The viscosity of the ink is adjusted by 2-(2-butoxyethyl-)ethyl acetate to give a drain time of 18 seconds from a #4 Ford cup.

As evidenced by the data shown in Table I, all papers coated with formulations containing polyamidoamines, e.g., Sample Nos. 1–9, exhibit improved printability as compared to the paper coated formulation containing no polyamidoamine (Sample No. C). Brightness and gloss are also improved by the presence of the polyamidoamine.

EXAMPLE 2

Following Example 1, several coating formulations are prepared except that starch is substituted for the latex used in Example 1. Coated papers are similarly prepared and tested and the results are reported in Table II.

TABLE II

| Sample No. | Pigment[1] Type | PAMAM[2] Type | PAMAM[2] Amt | Starch[3] | Gloss[4] | Brightness[5] | Printability[6] |
|---|---|---|---|---|---|---|---|
| 1 | K-3 | B | 0.08 | 8 | 53.8 | 70.6 | 30 |
| $C_1$* | K-3 | None | — | 8 | 55.1 | 68.8 | 19 |

*Not an example of the invention.
[1]Same as [1] in Table I.
[2]Same as [2] in Table I.
[3]Ethoxylated starch sold by Pennick & Ford under the tradename "PG 280".
[4]Same as [3] in Table I.
[5]Same as [4] in Table I.
[6]Similar to [5] in Table I except that a print pressure of 30 Kgf is used.

As evidenced by the data of Table II, the rotogravure formulations of this invention exhibit improved printability even when a starch binder is employed.

What is claimed is:

1. A coated paper comprising a paper substrate and a coating resulting from an aqueous coating formulation containing an opacifying amount of a pigment, a binding amount of a binder and an amount of a polyamidoamine sufficient to cause the pigment to interact or agglomerate.

2. The coated paper of claim 1 wherein the amount of polyamidoamine is sufficient to cause the pigment to flocculate from the aqueous phase of the formulation.

3. The paper of claim 2 wherein the polyamidoamine is a branched or linear polyamidoamine prepared from an alkylene diamine and an ethylenically unsaturated acrylate or methacrylate ester or acrylamide or methacrylamide, the binder is a copolymer of styrene, butadiene and an ethylenically unsaturated carboxylic acid and the pigment is kaolin clay.

4. The paper of claim 3 wherein the aqueous coating formulation comprises on a dry basis about 85 to about 96 weight parts of pigment, from. about 4 to about 15 weight parts of binder and from about 0.01 to about 0.5 weight part of the polyamidoamine.

5. An aqueous formulation comprising an opacifying amount of a pigment, a binding amount of a binder and an amount of a polyamidoamine sufficient to cause the pigment to interact or agglomerate.

6. The formulation of claim 5 wherein the amount of polyamidoamine is sufficient to cause the pigment to flocculate from the aqueous phase of the formulation.

7. The formulation of claim 5 wherein the polyamidoamine is a branched or linear polyamidoamine prepared from an alkylene diamine and an ethylenically unsaturated acrylate or methacrylate ester or acrylamide or methacrylamide, the binder is a copolymer styrene, butadiene and an ethylenically unsaturated carboxylic acid and the pigment is kaolin clay.

8. The formulation of claim 5 wherein the aqueous coating formulation comprises on a dry basis from about 85 to about 96 weight parts of pigment, from about 4 to about 15 weight parts of binder and from about 0.01 to about 0.5 weight part of the polyamidoamine.

9. A coated paper comprising a paper substrate and a coating resulting from the application of an aqueous coating formulation containing an opacifying amount of a pigment, a binding amount of a binder and an amount of a polyamidoamine sufficient to improve the rotogravure printability of the coated paper.

10. The coated paper of claim 9 wherein the polyamidoamine is a branched or linear polyamidoamine prepared from an alkylene diamine and an ethylenically unsaturated acrylate or methacrylate ester or acrylamide or methacrylamide, the binder is a copolymer of styrene, butadiene and an ethylenically unsaturated carboxylic acid and the pigment is kaolin clay.

11. The paper of claim 10 wherein the aqueous coating formulation comprises on a dry basis about 85 to about 96 weight parts of pigment, from about 4 to about 15 weight parts of binder and from about 0.01 to about 0.5 weight part of the polyamidoamine.

* * * * *